(12) United States Patent
Yoshida et al.

(10) Patent No.: US 6,212,761 B1
(45) Date of Patent: Apr. 10, 2001

(54) METHOD FOR MANUFACTURING THIN-FILM MAGNETIC HEAD

(75) Inventors: Tomoyuki Yoshida, Nagano; Noritsugu Kakegawa, Yamanashi, both of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/175,455

(22) Filed: Oct. 20, 1998

(30) Foreign Application Priority Data

Oct. 28, 1997 (JP) .................................................. 9-311076

(51) Int. Cl.⁷ ........................................................ G11B 5/42
(52) U.S. Cl. ................................ 29/603.09; 29/603.12; 29/603.17; 29/704
(58) Field of Search ........................... 29/603.12, 603.07, 29/603.09, 603.1, 603.17, 701, 702, 703, 720, 721, 740, 704

(56) References Cited

U.S. PATENT DOCUMENTS

| | | | |
|---|---|---|---|
| 4,359,157 | * | 11/1982 | Horstmann .......................... 206/328 |
| 5,235,164 | * | 8/1993 | Noyama et al. ...................... 235/375 |
| 5,283,943 | * | 2/1994 | Aguayo et al. ....................... 29/701 |
| 5,329,690 | * | 7/1994 | Tsugi et al. ........................... 29/701 |

FOREIGN PATENT DOCUMENTS

| | | |
|---|---|---|
| 0504887 | 9/1992 | (EP) . |
| 2152219 | 12/1990 | (JP) . |
| 06162449 | 6/1994 | (JP) . |
| 08077511 | 3/1996 | (JP) . |
| 9-73615 | 3/1997 | (JP) . |
| 11130566 | 5/1999 | (JP) . |

* cited by examiner

Primary Examiner—Carl E. Hall
(74) Attorney, Agent, or Firm—Arent Fox Kintner Plotkin & Kahn, PLLC

(57) ABSTRACT

A method for manufacturing a thin-film magnetic head includes a step of cutting a wafer into bars, each bar having a plurality of thin-film magnetic head sliders which are sequentially coupled with each other, a step of identifying the bar to be worked to generate an identification signal which indicates identity of the bar, a step of obtaining data of the bar in a unit of bar depending upon the identification signal, and a step of processing at least one working of the bar on the basis of the obtained data of the bar.

7 Claims, 7 Drawing Sheets

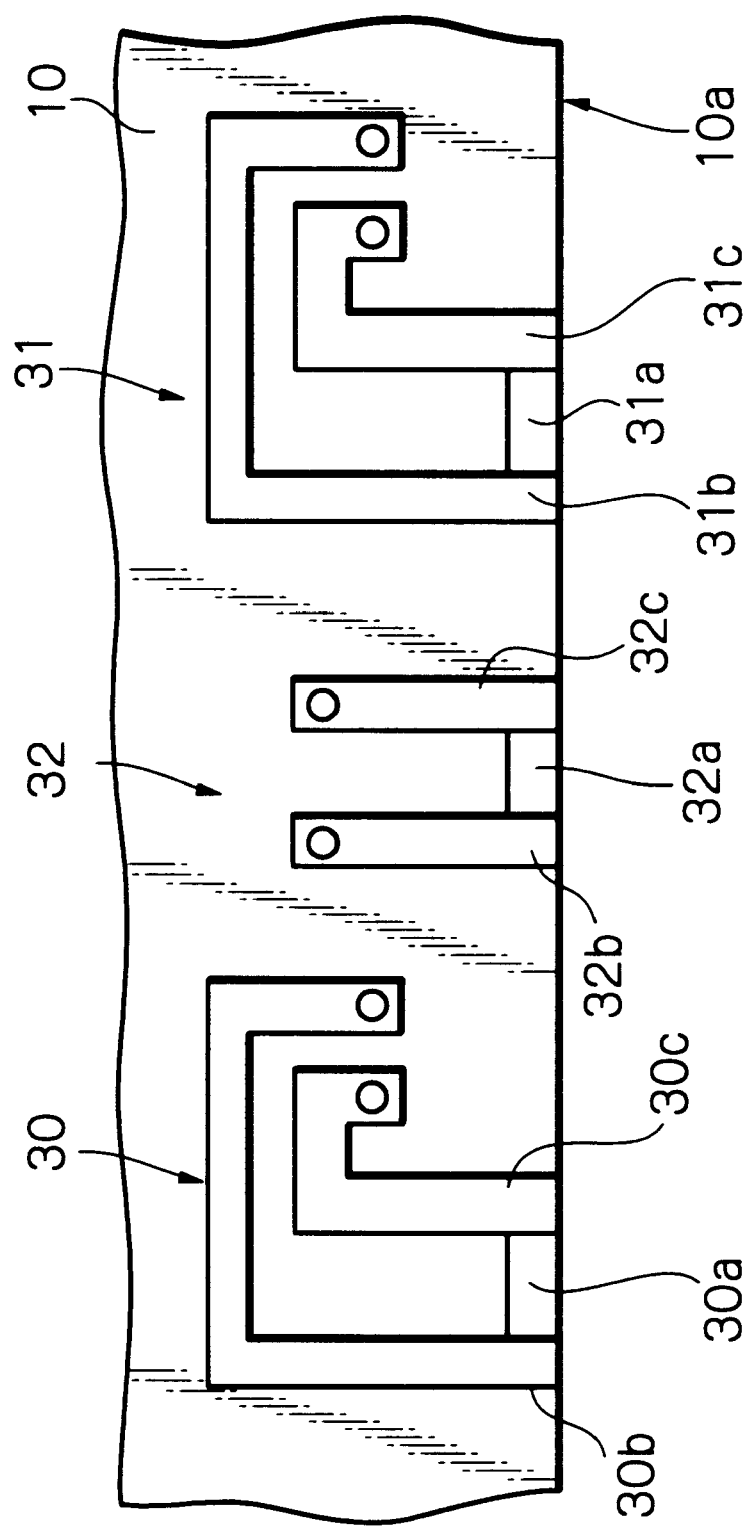

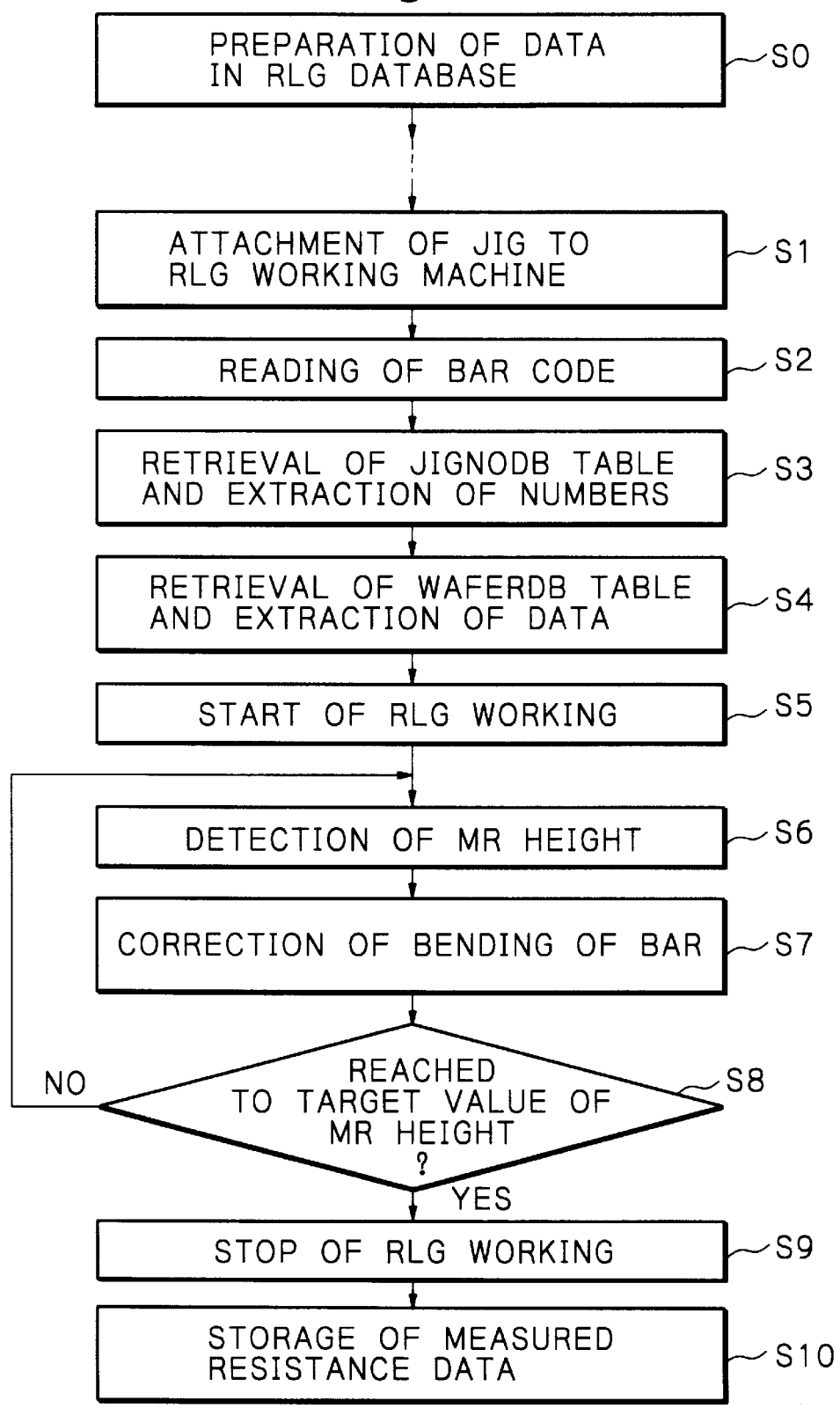

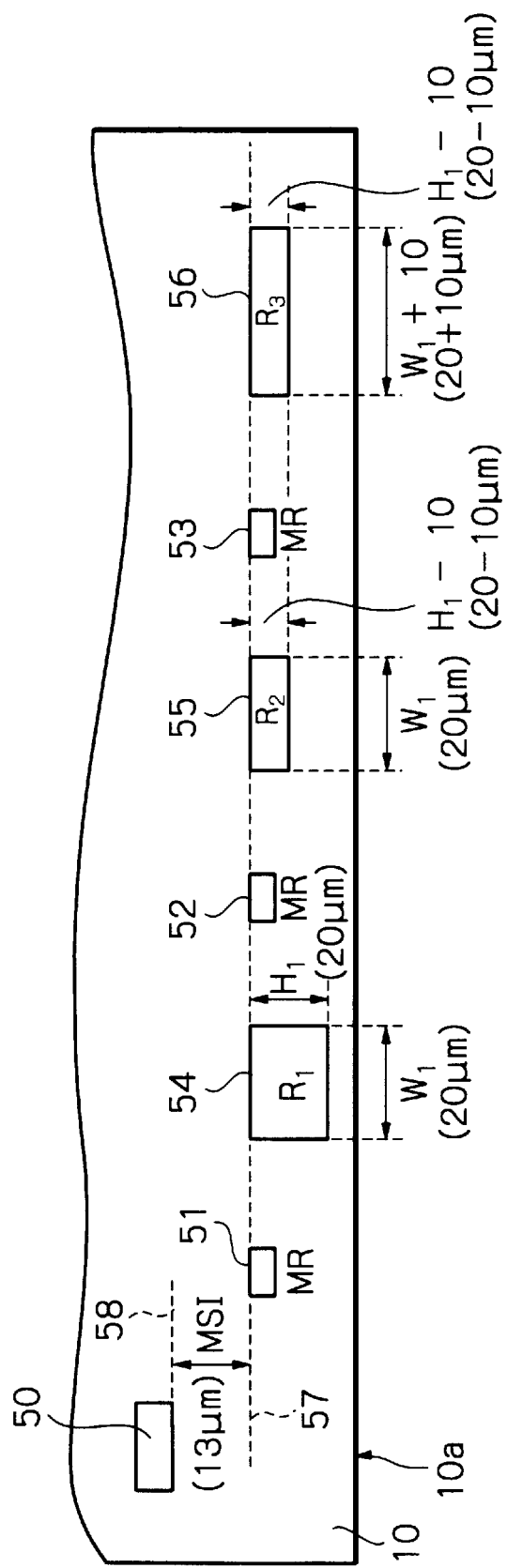

METHOD FOR MANUFACTURING THIN-FILM MAGNETIC HEAD

FIELD OF THE INVENTION

The present invention relates to a method for manufacturing a thin-film magnetic head and a manufacturing system of the thin-film magnetic head.

DESCRIPTION OF THE RELATED ART

In fabricating a thin-film magnetic head, a wafer with a large number of thin-film magnetic head elements is cut into rows so that a plurality of magnetic head sliders are sequentially coupled or aligned therein, and then each bar is processed for various works. In such working processes of each bar, it may be necessary to refer data inherent to the bar.

For example, control of a properties-determining height of a magnetoresistive effect (MR) head element (hereinafter referred to as MR height), which control is necessary for fabricating a thin-film magnetic head with the MR head element, is carried out by lapping an air bearing surface (ABS) of each bar. During the lapping of the ABS, the MR height is monitored by an electrical signal from a lapping control sensor called a RLG (Resistance lapping Guide) or EIG (Electric Tapping Guide) sensor to correct the bending of the bar and to control the stop position of lapping, so as to obtain optimum properties of the MR head element. In order to execute such a process using the RLG (or ELG) sensors, data inherent to the respective bars such as RLG center data which are different for the respective bars are required.

However, according to the conventional bar working process, data inherent to bars of each wafer are described on an independent recording paper, and this paper is transferred to the next process together with the wafer (workpiece), as described in, for example, Japanese unexamined patent publication No. 9(1997)-73615.

Thus, the workpieces have to be transferred from one working process to the next working process in a unit of wafer causing dwell time between the processes to increase. Furthermore, since each bar is visually identified and also identification signals or identifiers are manually input into a working machine, identification of the bar may take much time and incorrect bar working processes may be executed due to using of another bar data.

SUMMARY OF THE INVENTION

It is therefore an object of the present invention to provide a method for manufacturing a thin-film magnetic head and a manufacturing system of the thin-film magnetic head, whereby dwell time between working processes can be reduced.

It is another object of the present invention to provide a method for manufacturing a thin-film magnetic head and a manufacturing system of the thin-film magnetic head, whereby the bar identification is accurately and easily carried out to improve the yield ratio.

According to the present invention, a method for manufacturing a thin-film magnetic head includes a step of cutting a wafer into bars, each bar having a plurality of thinfilm magnetic head sliders which are sequentially coupled with each other, a step of identifying the bar to be worked to generate an identification signal which indicates identity of the bar, a step of obtaining data of the bar individually on a per bar basis depending upon the identification signal, and a step of working the bar on the basis of the obtained data of the bar.

Since the data of bars are extracted individually on a per bar basis, movement of bars from one process to another process can be performed for the bars individually. As a result, each process can be smoothly carried out causing dwell time between the processes to reduce. Furthermore, workings of the bars obtained from one wafer can be simultaneously performed in parallel.

It is preferred that the data obtaining step includes a step of extracting the data from a table which stores retrievable relationships of identification signals and data of bars on a per bar basis.

It is also preferred that the bar identifying step includes a step of identifying a jig or a transfer tool to which the bar is attached. Although it is considerably difficult to identify a bar from bars themselves because of its small identification sign, it is comparatively easy to identify the jig itself to which the bar is attached. Thus, identification of bars to be worked will be accurate and easy, whereby the problem according to the conventional art that incorrect bar working processes are executed due to using of another bar data can be solved.

The bar identifying step may include a step of identifying the bar by using a table which stores relationships of identifiers of bars and identifiers of jigs to which the respective bars are attached. By using such a reference table, identification of bars in each working process can be certainly and rapidly performed.

The jig identifying step may include a step of identifying the jig by using a bar code provided on the jig. If the bar code is used as the identification sign, reading of the sign can be more accurately performed than in a case where other identification sign is used.

It is preferred that the processing step includes a height, control step of controlling properties of the thin-film magnetic head by lapping an ABS of a slider of the thin-film magnetic head, and that the obtained data include data used in the height control step.

In this case, the height control step includes a step of measuring resistance values which vary by the lapping, a step of calculating a properties-determining height of the magnetic head from the ABS, for example MR height or throat height etc., on the basis of the measured resistance values, and a step of comparing the calculated height with a target height. The obtained data include data used in the calculating step.

It is also preferred that the thin-film magnetic head has a taper portion, that the processing step includes a taper working step of lapping the taper portion, and that the obtained data include data of a chamfer length used in the taper working step.

According to the present invention, a system for manufacturing a thin-film magnetic head includes a unit for cutting a wafer into bars, each bar having a plurality of thin-film magnetic head sliders which are sequentially coupled with each other, a unit for identifying the bar to be worked to generate an identification signal which indicates identity of the bar, a unit for obtaining data of the bar individually on a per bar basis depending upon the identification signal, and a unit for processing at least one working of the bar on the basis of the obtained data of the bar.

Since the data of bars are extracted individually on a per bar basis, movement of bars from one process to another process can be performed by the unit of bar. As a result, each process can be smoothly carried out causing dwell time between the processes to reduce. Furthermore, workings of the bars obtained from one wafer can be simultaneously performed in parallel.

It is preferred that the data obtaining unit includes a unit for extracting the data from a table which stores retrievable relationships of identification signals and data of bars individually on a per bar basis.

It is also preferred that the bar identifying unit includes a unit for identifying a jig to which the bar is attached. Although it is considerably difficult to identify a bar from bars themselves because of its small identification sign, it is comparatively easy to identify the jig itself to which the bar is attached. Thus, identification of bars to be worked will be accurate and easy, whereby the problem according to the conventional art that incorrect bar working processes are executed due to using of another bar data can be solved.

The bar identifying unit may include a unit for identifying the bar by using a table which stores relationships of identifiers of bars and identifiers of jigs to which the respective bars are attached. By using such a reference table, identification of bars in each working process can be certainly and rapidly performed.

The jig identifying unit may include a unit for identifying the jig by using a bar code provided on the jig. If the bar code is used as the identification sign, reading of the sign can be further surely performed than in a case where other identification sign is used.

It is preferred that the processing unit includes a height control unit for controlling properties of the thin-film magnetic head by lapping an ABS of a slider of the thin-film magnetic head, and that the obtained data include data used by the height control unit.

In this case, the height control unit includes a unit for measuring resistance values which vary by the lapping, a unit for calculating a properties-determining height of the magnetic head from the ABS on the basis of the measured resistance values, and a unit for comparing the calculated height with a target height. The obtained data include data used by the calculating unit.

It is preferred that the thin-film magnetic head has a taper portion, that the processing unit includes a taper working unit for lapping the taper portion, and that the obtained data include data of a chamfer length used by the taper working unit.

Further objects and advantages of the present invention will be apparent from the following description of the preferred embodiments of the invention as illustrated in the accompanying drawings.

BRIEF DESCRIPTION OF THE DRAWINGS

FIG. 3 is a view schematically illustrating a planar structure of one of RLG sensors;

FIG. 4 is a flow chart schematically illustrating a flow of a RLG working process;

FIG. 5 is a view illustrating arrangement and pattern of MR head elements and RLG sensors on a bar; and FIG. 6, which is constituted by combining

DESCRIPTION OF THE PREFERRED EMBODIMENTS

Figure 1:
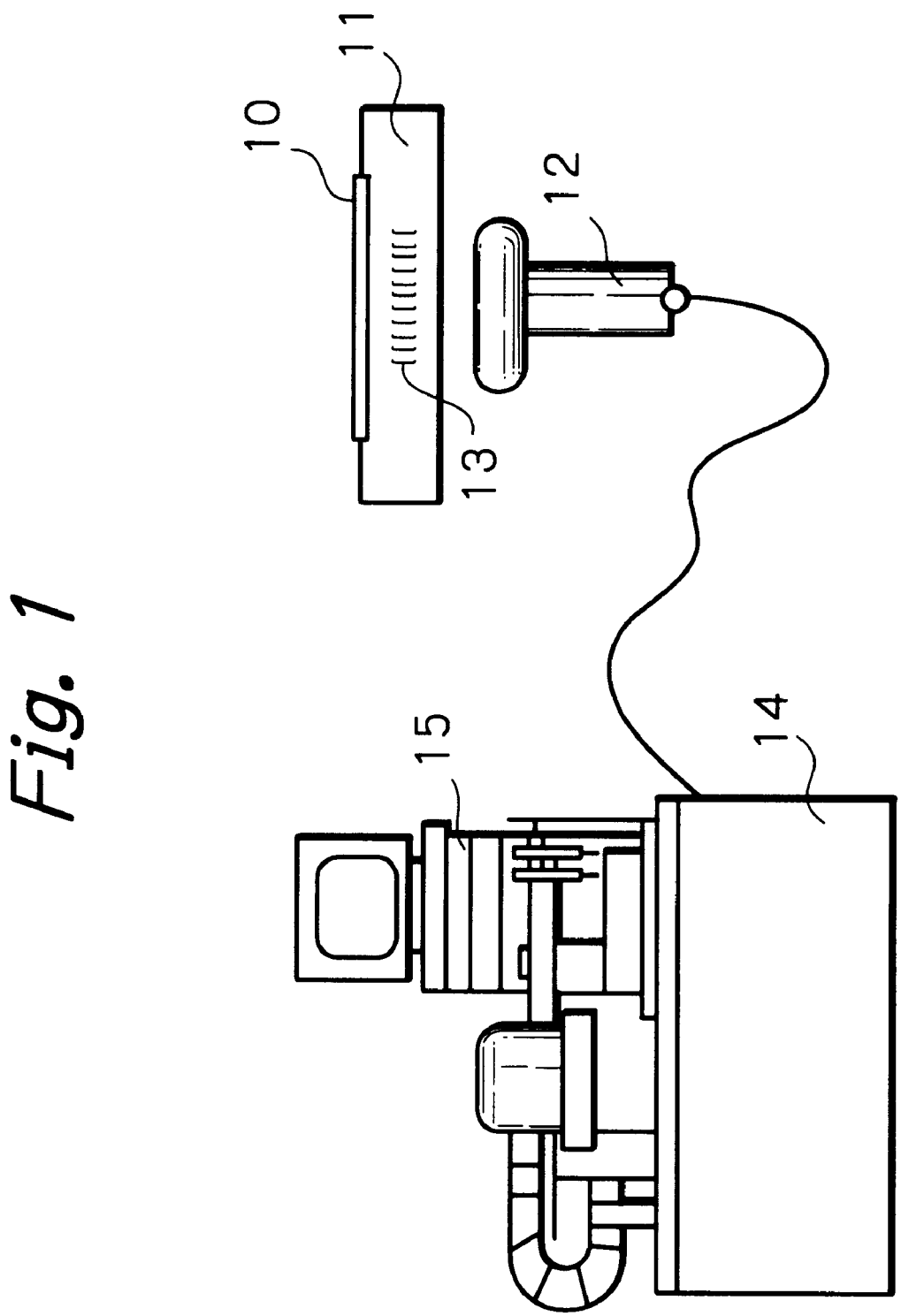
FIG. 1 is a view schematically illustrating a part of constitution of a RLG working system used in manufacturing of a thin-film magnetic head slider with a MR head element according to a preferred embodiment of the present invention.
Figure 2:
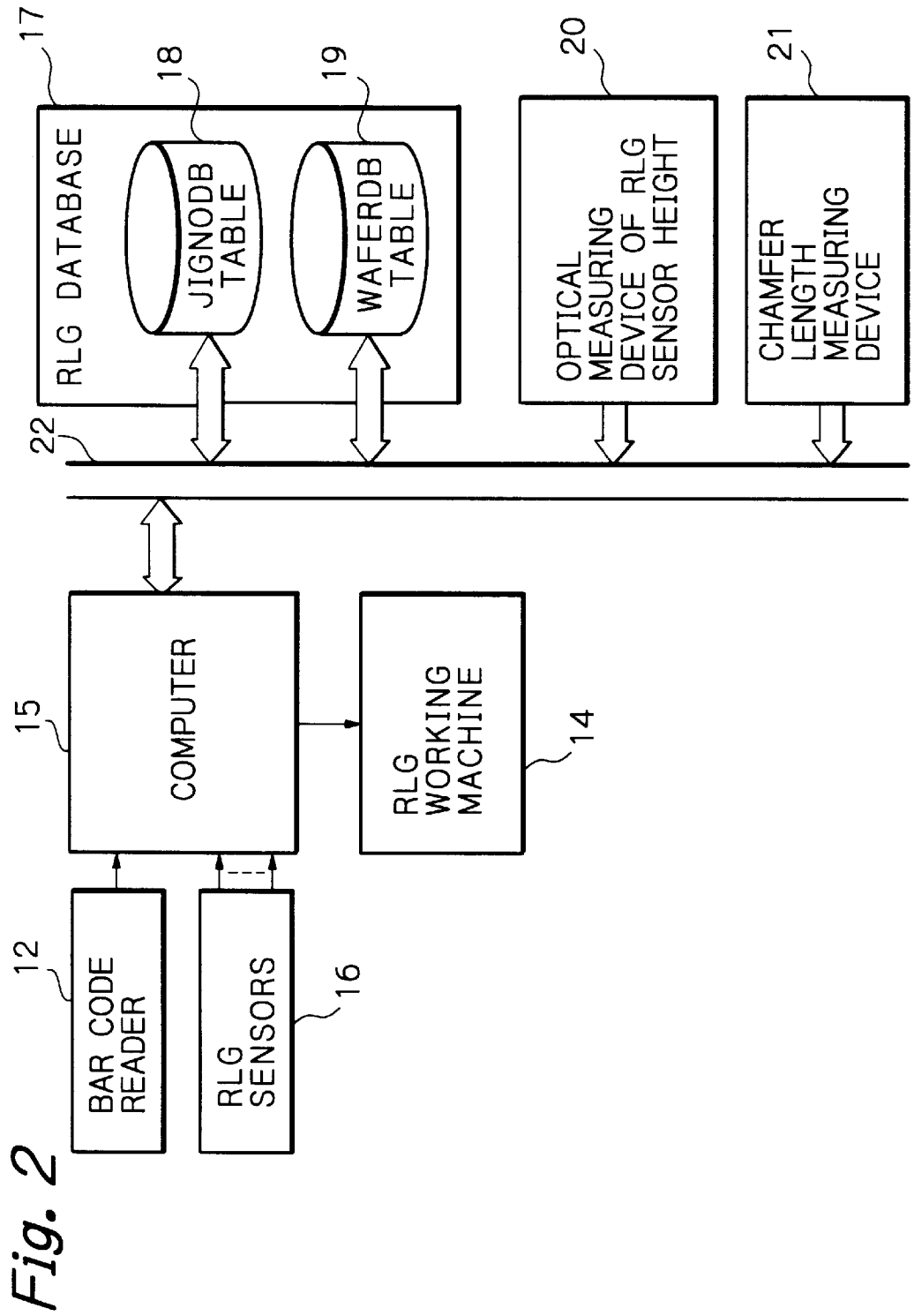
FIG. 2 is a block diagram illustrating electrical constitution of the embodiment shown in FIG. 1.

FIG. 1 schematically illustrates a part of constitution of a RLG working system for carrying out a MR height working process and a taper working process according to a preferred embodiment of the present invention, and FIG. 2 illustrates electrical constitution of the embodiment in FIG. 1.

In FIGS. 1 and 2, reference numeral 10 denotes a bar in which a plurality of thin-film magnetic head sliders formed by cutting a wafer (not shown) are aligned, 11 denotes a jig or a transfer tool for the RLG working to which the bar 10 is attached, 12 denotes a bar code reader for reading a bar code 13 provided on the jig 11, 14 denotes a RLG working machine for carrying out the MR height working process and taper working process, 15 denotes a personal computer electrically connected to this RLG working machine 14 and the bar code reader 12, 16 denotes a plurality of RLG sensors (lapping control sensors) provided on the bar 10 and connected to the computer 15, 17 denotes a RLG database having a jig number database (JIGNODB) table 18 and a wafer database (WAFERDB) table 19, 20 denotes an optical measuring device of RLG sensor height, and 21 denotes a chamfer length measuring device. The computer 15, the RLG database 17, the sensor height optical measuring device 20 and the chamfer length measuring device 21 can transmit and receive data through a network such as LAN 22. Although not shown in FIG. 2, a plurality of sets each composed of the computer 15 and the RLG working machine 14 can be connected to the LAN 22.

In this embodiment, the jig 11 is formed by a white ceramic material, and a black colored bar code which represents a jig number for identifying this jig itself (identification sign) is formed on a side surface of the jig 11 by laser processing.

The RLG working machine 14 conducts control of stopping position for MR height (or throat height) working of bar 10, correction of bending of a bar, and working of a slider taper portion in control of the computer 15. The structure of this type of working machine is well known from, for example, U.S. Pat. No. 5,620,356.

The RLG sensors 16 are simultaneously formed together with MR head elements in the wafer processing stage. The planar structure of one or the RLG sensors is shown in FIG. 3 which illustrates a plan view of MR head element portions and a RLG sensor port ion of the bar 10. In this figure, although all the MR head element portions and the RLG sensor portion cannot be seen from outside due to an inductive head element multi-layered on this structure, a part of these layers on the bar 10 is transparently viewed.

In FIG. 3, reference numeral 10 denotes the bar, 10a denotes an ABS of the bar 10, which is to be lapped, 30 and 31 denote two of a plurality of MR head elements formed in one row along this bar 10, 32 denotes one of the RLG sensors formed in a space area between the MR head elements 30 and 31 in parallel with these MR head elements, 30a and 31a denote MR layers of the respective MR head elements 30 and 31, 30b and 31b, and 30c and 31c denote lead conductors connected to both ends of the MR layers 30a and 31a, 32a denotes a resistor layer of the RLG sensor 32, and 32b and 32c denote lead conductors connected to both ends of the resistor layer 32a. The MR layers 30a and 31a and the resistor layer 32a run in parallel with the ABS 10a.

The JIGNODB table 18 is a reference table in which relationships of a wafer number for identifying the wafer, a bar number for identifying the bar 10 and a jig number of the jig 11 to which the bar 11 is attached are stored. The WAFERDB table 19 is a database in which a wafer number is used as a first retrieval key and a bar number is used as a second retrieval key. In the table 19, various working data inherent to each bar are stored so that the data corresponding to different bars can be retrieved individually on a per bar basis.

The RLG sensor height optical measuring device 20 optically measures non-lapped RLG sensor height in the wafer processing stage. The optically measured data with respect to RLG sensor height hereinafter referred to as MSI data is transferred to the WAFERDB table 19 through the LAN 22 during the wafer processing stage. The chamfer length measuring device 21 measures a chamfer length, namely length of the taper portion of bar 10. The measured data of the chamfer length is transferred to the computer 15 through the LAN 22.

FIG. 4 schematically illustrates a flow of the RLG working process in this embodiment.

Before starting the RLG working process, data are prepared in the RLG database 17 (step S0). That is, during the wafer processing stage, parameters inherent to each bar, which are necessary for calculation of MR height and calculated from measured resistance data from the RLG sensor 16 and MSI data from the optical measuring device 20, working target values of the MR height and working standards (errors) are stored in the WAFERDB table 19 for each bar in a unit of wafer. Furthermore, each bar 10 separated from the wafer by cutting is adhered to the working jig 11, and relationships of the wafer number for identifying the wafer, the bar number for identifying the bar 10 and the jig number of the jig 11 to which the bar 10 is adhered are stored in the JICNODB table 18.

The parameters inherent to each bar which are necessary for calculation of the MR height and stored in the WAFERDB table 19 are calculated as follows.

As shown in FIG. 5, a marker 50, a plurality of MR head elements 51, 52, 53, ..., and RLG sensors 54, 55, 56, ... are formed on the single bar 10 in rows. The MR head elements 51, 52 and 53 and the first, second and third RLG sensors 54, 55 and 56 are alternately aligned. These RLG sensors 54, 55 and 56 have patterns different from each other. A plurality of sets, for example, 12 sets of the first, second and third RLG sensors 54, 55 and 56 are formed on the single bar 10. This 12 sets case corresponds to a case of 30% shrink magnetic head. Edges 57 opposite to the ABSs 10a of the MR head elements and the RLC sensors are aligned on the same line which is parallel to the ABS 10a. Although omitted in FIG. 5, to these MR head elements and RLG sensors are connected lead conductors as shown in FIG. 3.

Width and height of the first RLG sensor 54 are defined as $W_1$ and $H_1$ ($\mu$m), width and height of the second RLG sensor 55 are defined as $W_1$ and $H_1-10$, width and height of the third RLG sensor 56 are defined as $W_1+10$ and $H_1-10$.

In order to correct a difference between a designed pattern size on a mask used for making these pattern and an actual pattern size of the bar, distance (MSI) between the edge 58 positioned on the ABS side of the marker 50 and the edges 57 opposite to the ABS side of the MR head elements and RLG sensors is measured by the optical measuring device 20. Then, the difference between the measured MSI data and the designed value of 13 $\mu$m for example is added to or subtracted from $H_1$. The designed value of $H_1$ is 20 $\mu$m, and the designed value of $W_1$ is also 20 $\mu$m.

A resistance value $R_1$ of the first RLG sensor 54, a resistance value $R_2$ of the second RLG sensor 55, and a resistance value $R_3$ of the third RLG sensor 56 are given by the following expressions;

$$R_1 = R_L + (C + S \times W_1)/H_1$$

$$R_2 = R_L + (C + S \times W_1)/(H_1 - 10)$$

$$R_3 = R_L + \{C + S \times (W_1 + 10)\}/(H_1 - 10)$$

where RL represents a resistance value of lead conductors, S represents a sheet resistance value defined by the material and thickness of a resistor layer, and C represents other resistance (resistance value per a unit of height) such as crowding resistance.

$(C + S \times W_1)$ and $R_L$ can be calculated using $R_1$ and $R_2$ in these expressions as follows.

$$C + S \times W_1 = -H_1 \times (H_1 - 10) \times (R_1 - R_2)/10$$

$$R_L = R_1 + (H_1 - 10) \times (R_1 - R_2)/10$$

Thus, $(C + S \times W_1)$ and $R_L$ are calculated with $H_1$ corrected by MSI data and resistance data $R_1$ and $R_2$ actually measured by the first and second RLG sensors 54 and 55, using the above-described expressions. Then, the obtained values are stored in WAFERDB table 19.

RLG working process is actually started from stop S1 in FIG. 4. First, the jig 11 to which the bar 10 to be lapped is adhered is placed on the RLG working machine 14 (stop S1). After the placement, the bar code 13 described on the jig 11 is read out by the bar code reader 12 (stop S2).

Thus, the computer 15 obtains a jig number from input bar code data, and retrieves the JIGNODB table 18 of the RLG database 17 by referring to the obtained jig number, and extracts a wafer number and a bar number (stop S3).

Then, the WAFERDB table 19 of the RLG database 17 is retrieved by referring to these wafer number and bar number, and parameters inherent to the bar, a target value of MR height working, and working standards (errors) thereof are extracted from the table 19 (stop S4).

Then, the RLG working process for lapping the ABS is started on the basis of the extracted data (step S5). This RLG working process is carried out as follows. During lapping, resistance values of the RLG sensors are repeatedly (at a predetermined interval, for example, 10 seconds) detected and MR heights $H_M R$ at that time are calculated (step S6). Then, bending of the bar is corrected to uniform MR heights in the respective portions of the bar, in response to the calculated values (step S7). If the calculated MR heights $H_{MR}$ have reached to the target value, the Lapping is stopped (step S8 and S9). After the RLG working process is completed, finally measured resistance data $R_1$ and $R_2$ are stored in the WAFERDB table 19 (step S10).

In this embodiment, the resistance values $R_1$ and $R_2$ of the first and second RLG sensors 54 and 55 are detected and MR heights are calculated from the detected resistance values. The MR height $H_{MR}$ is calculated by parameters $R_L$ and $(C + S \times W_1)$ inherent to the bar and by detected resistance data $R_1$ and $R_2$, using the following expression;

$$H_{MR} = (C + S \times W_1)/(R_1 - R_L)$$

or $$H_{MR} = (C + S \times W_1)/(R_2 - R_L).$$

Figure 6A:
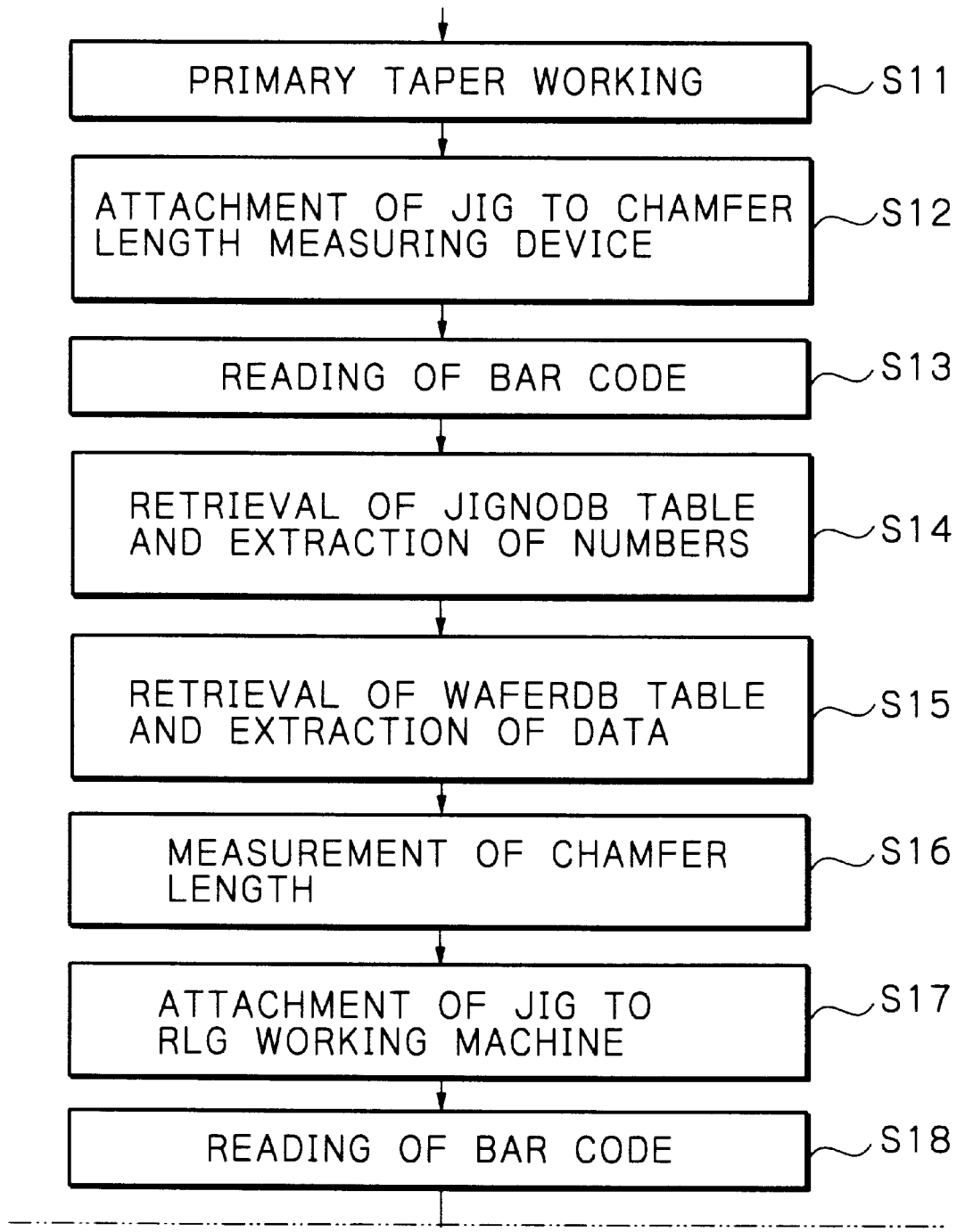
FIGS. 6A and 6B, is a flow chart schematically illustrating a flow of a taper working process.
Figure 6B:
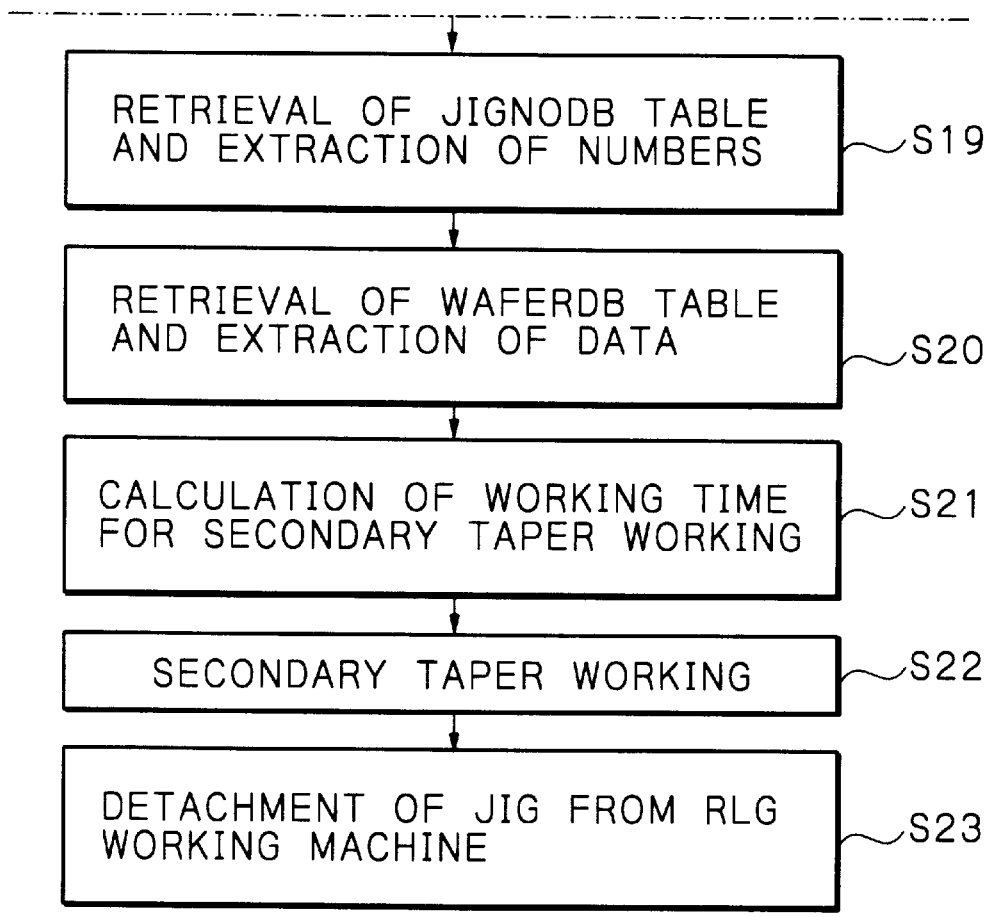

FIG. 6 schematically illustrates a flow of a taper working process in this embodiment which is carried out sequentially to the RLG working process shown in FIG. 4.

After the RLG working process has been completed, a primary taper working (rough working) of the bar is carried out for a required time with the jig 11 attached to the RLG working machine 14 (step S11).

Then, the jig 11 is detached from the RLG working machine 14, and is placed on the chamfer length measuring device 21 to measure its chamfer length after the primary taper working (step S12). Then, the bar code 13 of the jig 11 is read out by the bar code reader 12 (step S13).

Thus, the computer 15 obtains a jig number from input bar code data, retrieves JIGNODB table 18 for the RLG database 17 by referring to the obtained jig number, and extracts a wafer number and a bar number (step S14).

Then, the WAFERDB table 19 of the RLG database 17 is retrieved by referring to these wafer number and bar number, and working standard values of this bar are extracted from the table 19 (step S15).

Then, the chamfer length is measured by the chamfer length measuring device 21, and the measured data is stored in the WAFERDB table 19 (step S16).

The jig 11 is then detached from the chamfer length measuring device 21, and is placed on the RLG working machine 14 (step S17). Thereafter, the bar code 13 of the jig 11 is read out again by the bar code reader 12 (step S18).

Thus, the computer 15 obtains the jig number from input bar code data, retrieves JIGNODB table 18 for the RLG database 17 by referring the obtained jig number, and extracts the wafer number and bar number (step S19).

Then, the WAFERDB table 19 for the RLG database 17 is retrieved by referring the wafer number and the bar number, and the measured data of the chamfer length of the bar and the standard values of the bar are extracted from the table 19 (step S20).

From thus obtained measured data of the chamfer length, the standard values and the time period of the primary taper working (rough working), a required time period for a secondary taper working (accurate working) by which the chamfer length becomes a target value is calculated (step S21).

The secondary working is then carried out on the basis of this calculated time period (step S22). After the completion of the secondary working, the jig 11 is detached from the RLG working machine 14 (step S23).

As explained above, since WAFERDB table 19 stores retrievable data in a unit of bar, the workpieces in one process can be moved to next process by the unit of bar. As a result, each process can be smoothly carried out causing dwell time between the processes to reduce.

Furthermore, since identification of the bar 10 to be worked is carried out by identifying the jig 11 to which the bar 10 is attached, the identification of the bar 10 to be worked is certain and easy, whereby the problem according to the conventional art that incorrect bar working processes are executed due to using of another bar data can be solved. In addition, since the identification of the bar 10 is carried out by using JIGNODB table 18 in which relationships of the wafer number, the bar number and the jig number are stored, the bar identification in each working process can be certainly and rapidly carried out. Therefore, working manhour for retrieval or else is greatly decreased.

Furthermore, since the jig is identified by using a bar code, reading can be certainly carried out than in a case where other identification signs are used.

Alternatively, if a plurality of sets of a computer and a RLG working machine are in parallel connected to RLG database through a network of such as LAN, a working process such as a RLG working can be simultaneously carried out with respect to bars of one wafer.

Although in the above-mentioned embodiment, data is used in a unit of bar in the RLG working process and the taper working process, it is apparent that the same advantages will be obtained in other working processes and other processes other than the working processes such as a visual test process for a slider.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for manufacturing a thin-film magnetic head comprising the steps of:

cutting a wafer into bars, each bar having a plurality of thin-film magnetic head sliders which are sequentially coupled with each other;

identifying the bar to be worked by generating an identification signal which indicates identity of said bar;

obtaining data of said bar depending upon said identification signal by extracting said data from a table which stores retrievable relationships of identification signals and data of bars individually on a per bar basis, said data including information which are inherent to said bar and are used for working of said bar;

working said bar on the basis of said extracted data of said bar; and storing data which includes measured information of said bar after said working step is performed in said table in relation to said identification signal.

2. The method as claimed in claim 1, wherein said bar identifying step includes a step of identifying a jig to which said bar is attached.

3. The method as claimed in claim 2, wherein said bar identifying step includes a step of identifying said bar by using a table which stores relationships of identifiers of bars and identifiers of jigs to which the respective bars are attached.

4. The method as claimed in claim 2, wherein said jig identifying step includes a step of identifying the jig by using a bar code provided on the jig.

5. The method as claimed in claim 1, wherein said processing step includes a height control step of controlling properties of the thin-film magnetic head by lapping an air bearing surface of a slider of the thin-film magnetic head, and wherein said obtained data include data used in the height control step.

6. The method as claimed in claim 5, wherein said height control step includes the steps of measuring resistance values which vary by said lapping, calculating a properties-determining height of said magnetic head from the air bearing surface on the basis of the measured resistance values, and comparing the calculated height with a target height, and wherein said obtained data include data used in said calculating step.

7. The method as claimed in claim 1, wherein said thin-film magnetic head has a taper portion, wherein said processing step includes a taper working step of lapping said taper portion, and wherein said obtained data include data of a chamfer length used in said taper working step.

* * * * *